T. J. MAYALL.
Implements for Washing Windows, &c.
No. 141,368. Patented July 29, 1873.
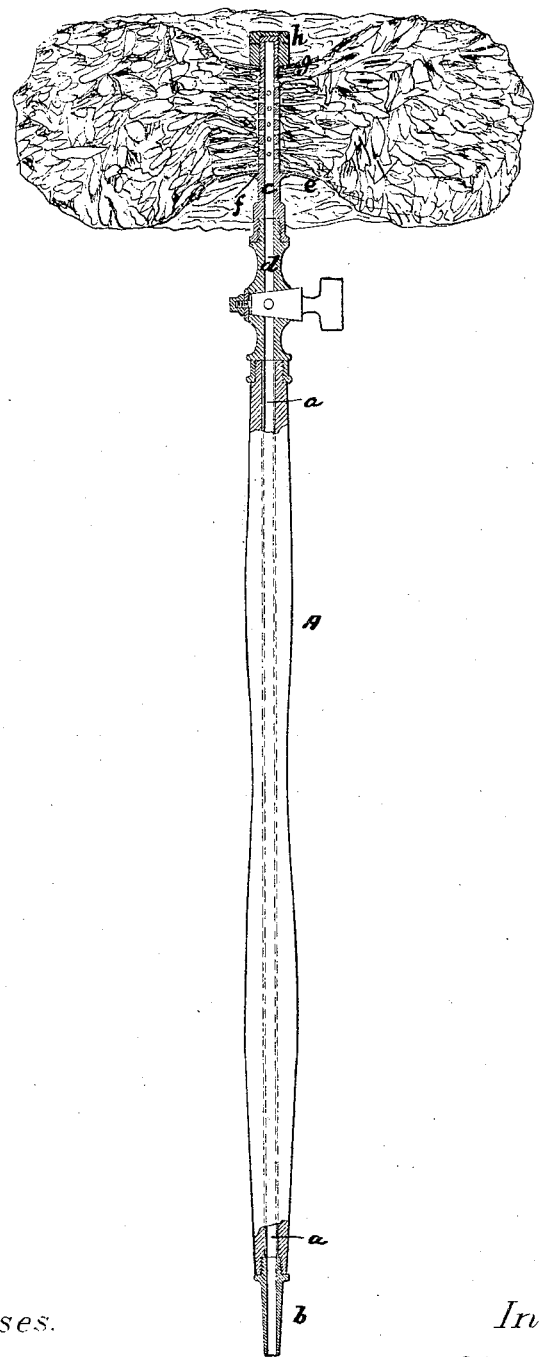

UNITED STATES PATENT OFFICE.

THOMAS J. MAYALL, OF BOSTON, MASSACHUSETTS.

IMPROVEMENT IN IMPLEMENTS FOR WASHING WINDOWS, &c.

Specification forming part of Letters Patent No. 141,368, dated July 29, 1873; application filed June 28, 1873.

*To all whom it may concern:*

Be it known that I, THOMAS J. MAYALL, of Boston, Suffolk county, Massachusetts, have invented a certain new and useful Implement for Washing Windows, Carriages, and other purposes, of which the following is a specification:

The implement in which my invention is comprised consists, essentially of a hollow stem or tube formed at one end to connect with a water hose or pipe and fitted with a sponge held on the same by top and bottom nuts or washers, the said stem being perforated at the part where it is encircled by the sponge.

The device can be used with or without a handle. I prefer the latter arrangement for general purposes.

Water introduced into the handle from the tubing connected with said handle will discharge through the perforated stem into the surrounding mass of sponge. The latter can thus be kept continually wet when in use, a stop-cock in the handle regulating the flow of the water. The top and bottom nuts or washers serve to hold the sponge lightly in place on the stem, and can readily be removed whenever it becomes necessary to renew or change the sponge.

To avoid danger of fracturing glass or of scratching surfaces, I prefer to make the upper nut and washer—that is, the nut and washer on top of the sponge—of vulcanized rubber; and, indeed, the lower or under washer I prefer to make of the same material.

The accompanying drawing indicates the manner in which my invention is carried into effect, the figure there shown being a longitudinal central section of the implement.

A is the wooden handle, of any convenient configuration and length, through which extends a tube, as indicated, partly in section and partly in dotted lines. This tube is prolonged at the lower end of the handle by a tubular metallic neck or nozzle, *b*, upon which is to be fitted the flexible water-pipe or hose for conveying water to the handle. The other end of the handle is fitted with a tubular metallic stem, formed, for convenience sake, in two parts, *c d*, screwing together, the lower part *d* screwing onto the handle. The part *d* carries the stop-cock for regulating the flow of water to the upper part *c* of the stem. This part is closed at the top and is perforated on the sides, so that the water admitted from the handle may pass out from it. The stem, for a portion of its length, is closely encircled by a sponge, up through the center of which the stem is pushed until the sponge brings up against a washer, *e*, held by a flange, *f*, on the stem. A second washer, *g*, is then fitted on the upper end of the stem, and then on the said end of the stem, which is screw-threaded for the purpose, is screwed down a nut, *h*, which serves to compress the sponge tightly and firmly between the two washers on the central stem.

For the reasons above stated, I make the upper washer and the nut of rubber; and, indeed, the nut may be made like a cap, if need be to completely cover the end of the stem, as represented in the drawing.

It may be found desirable at times to dispense with the handle, the sponge being taken directly in the hand when used. To this end the lower end of the stem *d* may be adapted to connect directly with the water-pipe instead of through the intermediary of the handle.

The implement, as a whole, is compact, convenient, and of much utility, answering admirably for washing windows and carriages, and for general household use.

What I claim, and desire to secure by Letters Patent, is—

The herein-described implement consisting of a tubular perforated stem fitted with a sponge, held thereon by a nut and washer of rubber, said stem being adapted to connect with a water pipe or hose, either directly or through the intermediary of a handle, as shown and set forth.

In testimony whereof I have signed my name in the presence of two subscribing witnesses.

THOS. J. MAYALL.

Witnesses:
 JOHN BULKLEY,
 EDM. F. BROWN.